(12) United States Patent
Tsuji et al.

(10) Patent No.: US 8,757,522 B2
(45) Date of Patent: Jun. 24, 2014

(54) ATOMIZATION COOLING EQUIPMENT AND ATOMIZING METHOD

(75) Inventors: Toshihide Tsuji, Tokyo (JP); Tatsuya Hayashi, Tokyo (JP)

(73) Assignee: Hochiki Corporation, Tokyo (JP)

( * ) Notice: Subject to any disclaimer, the term of this patent is extended or adjusted under 35 U.S.C. 154(b) by 301 days.

(21) Appl. No.: 13/086,550

(22) Filed: Apr. 14, 2011

(65) Prior Publication Data

US 2011/0186646 A1  Aug. 4, 2011

Related U.S. Application Data

(63) Continuation of application No. PCT/JP2009/050654, filed on Jan. 19, 2009.

(30) Foreign Application Priority Data

Oct. 22, 2007  (JP) .................................. 2007-273440

(51) Int. Cl.
*B05B 5/00* (2006.01)
(52) U.S. Cl.
USPC ......... 239/690.1; 239/690; 239/708; 239/570
(58) Field of Classification Search
USPC .............. 239/690, 690.1, 697, 698, 706, 707, 239/708, 570, 571, 576, 577
See application file for complete search history.

(56) References Cited

U.S. PATENT DOCUMENTS 3,608,793 A * 9/1971 VanLobenSels ............... 222/490
8,282,028 B2 * 10/2012 Nakada et al. ............. 239/690.1

FOREIGN PATENT DOCUMENTS

| JP | 07-301167 | 11/1995 |
|---|---|---|
| JP | 08-093602 | 4/1996 |
| JP | 2002-177823 | 6/2002 |
| JP | 2002-203657 | 7/2002 |
| JP | 2002-538910 | 11/2002 |
| JP | 2005-028323 | 2/2005 |
| JP | 2005-028325 | 2/2005 |
| JP | 2005-187069 | 7/2005 |
| JP | 2005-214578 | 8/2005 |
| JP | 2006-149294 | 6/2006 |
| JP | 2006-177577 | 7/2006 |
| JP | 2006-305321 | 11/2006 |
| JP | 2008-084789 | 4/2008 |
| KR | 10-0168982 | 1/1999 |
| WO | 00/54892 | 9/2000 |
| WO | WO2007/111120 | * 10/2007 |

OTHER PUBLICATIONS

Japanese Office Action issued Aug. 28, 2012 in Japanese Patent Application No. 2007-273440 with partial English translation.

(Continued)

*Primary Examiner* — Christopher Kim
(74) *Attorney, Agent, or Firm* — Wenderoth, Lind & Ponack, L.L.P.

(57) ABSTRACT

Cooling water is pressurized and supplied via a pipe to an electrified atomization head installed in an atomization cooling area. The jetted particles of the cooling water from the electrified atomization head are electrified and atomized. An electrification voltage is applied from a voltage application unit to the electrified atomization head, and the external electric field generated by applying a voltage between a water-side electrode unit and an induction electrode unit is applied to the cooling water in a jetting process so as to electrify the atomization water and facilitate adsorption to people.

5 Claims, 7 Drawing Sheets

(56) References Cited

OTHER PUBLICATIONS

International Search Report issued Apr. 21, 2009 in International (PCT) Application No. PCT/JP2009/050654.

Japanese Office Action issued Feb. 7, 2012 in Japanese Patent Application No. 2007-273440 with English translation.

Korean Office Action issued Dec. 7, 2012 in Korean Patent Application No. 10-2011-7012267 with partial English translation.

* cited by examiner

ATOMIZATION COOLING EQUIPMENT AND ATOMIZING METHOD

This application is a continuation of PCT/JP2009/050654 filed Jan. 19, 2009.

BACKGROUND OF THE INVENTION

1. Field of the Invention

The present invention relates to atomization cooling equipment and an atomizing method which give a refreshing cooling sensation by atomizing atomization water to cooling target space such as open space through which people pass.

2. Description of the Related Arts

Conventionally, atomization cooling equipment which pressurizes and supplies cooling water to an atomization head to jet finely atomized water and cool space by the heat of vaporization of the finely atomized water has been known as cooling equipment which can be applied to open space and space for various purposes through which people pass. Such atomization cooling equipment is supposed to reduce the temperature of air by absorbing the evaporative latent heat when the finely atomized water jetted from the atomization head is evaporated in the space and give a refreshing cooling sensation by absorbing the heat of evaporation when some finely atomized water directly abuts the human skin and is instantaneously evaporated on the skin.

Patent Document 1: Japanese Unexamined Patent Application Publication No. 2006-149294

However, in such conventional atomization cooling equipment, since the mole weight of water vapor is as small as about 60% of the mole weight of air, the air of which temperature has been reduced by evaporation of the finely atomized water jetted from the atomization head tends to be dissipated upward although the specific gravity of the air is increased in appearance since the air is mixed with the finely atomized water by the buoyance of the evaporated water vapor, and, furthermore, high-temperature air flows thereinto from the surrounding space when the temperature of the air is reduced; and, as a result, the obtained cooling effect is not so high, which is a problem.

SUMMARY OF THE INVENTION

It is an object of the present invention to provide atomization cooling equipment and an atomizing method capable of giving a sufficient refreshing cooling sensation by atomization of atomized water.

The present invention provides atomization cooling equipment provided with:

cooling water supplying equipment for supplying pressurized cooling water via a pipe;

an electrified atomization head for electrifying and atomizing atomization water of the pressurized cooling water supplied by the cooling water supplying equipment, the electrified atomization head being installed in cooling target space; and a voltage application unit for applying a voltage to the electrified atomization head.

Herein, the electrified atomization head is provided with:

an atomization nozzle for atomizing the cooling water to water particles converted by jetting the cooling water to external space;

an induction electrode unit disposed in a jetting space side of the atomization nozzle, and a water-side electrode unit disposed in the atomization nozzle and brought into contact with the cooling water; and the voltage application unit applies an external electric field generated by applying a voltage between the induction electrode unit and the water-side electrode unit to the cooling water in a jetting process by the atomization nozzle so as to electrify the water particles.

The water-side electrode unit of the electrified atomization head is part of the atomization nozzle using an electrically conductive material or the pipe using an electrically conductive material.

The induction electrode unit of the electrified atomization head is any of or a complex of a metal having electrical conductivity, a resin having electrical conductivity, or a rubber having electrical conductivity and has any of a ring shape, a cylindrical shape, a vertical flat plate shape, a parallel-plate shape, a linear shape, or a wire-mesh-like shape.

The electrified atomization head causes the voltage of the water-side electrode unit to be zero volt, leads the water-side electrode unit to earth, and applies a predetermined electrification voltage from the voltage application unit to the induction electrode unit. The voltage application unit applies a DC voltage of 0.3 kilovolt to 20 kilovolts to the induction electrode unit. The electrified atomization head atomizes the atomization water having an average particle size of 100 μm or less.

The present invention provides an atomizing method of atomization cooling equipment, the method including:

supplying pressurized cooling water via a pipe to an electrified atomization head installed in cooling target space; and, electrifying and atomizing the atomization water of the pressurized cooling water supplying from the electrified atomization head.

According to the present invention, when the atomization water from the electrified atomization head is electrified, the amount of adhesion to the human skin is increased by the Coulomb force, and the refreshing cooling sensation can be enhanced. Moreover, since each of the water particles atomized to the space is electrified, repulsive force works between the water particles, the probability that the particles collide and associate with each other and grow and fall is small, the water particles which stay in the space are increased, and the specific gravity of the atomized-water-mixed air in appearance is increased compared with that of a non-electrified case to suppress the tendency that the air is dissipated upward is suppressed. As a result, the cooling effect is increased. Furthermore, when the atomization water from the electrified atomization head is negatively electrified, the state similar to that of the so-called Lenard effect said to be generated at natural waterfalls can be generated, and the refreshing cooling sensation can be increased.

DETAILED DESCRIPTION OF THE INVENTION

Figure 1:
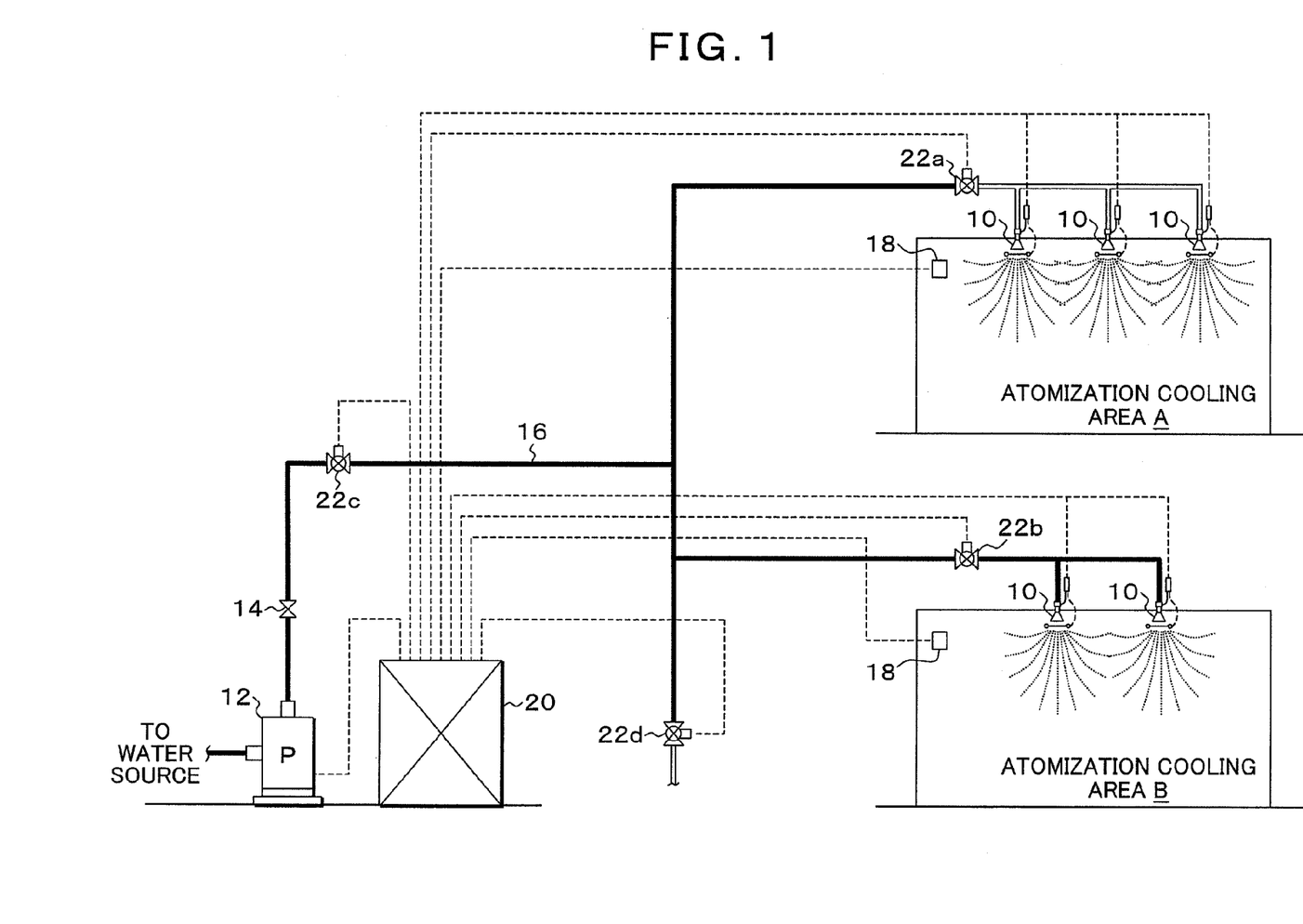
FIG. 1 is an explanatory drawing showing an embodiment of atomization cooling equipment according to the present invention.

FIG. 1 is an explanatory drawing showing an embodiment of atomization cooling equipment according to the present invention. In FIG. 1, atomization cooling areas A and B are the cooling target space such as open space through which people pass, and electrified atomization heads 10 according to the present embodiment are installed at the positions above the atomization cooling areas A and B, for example, at the positions at the height where passage of people is not disturbed. From the discharging side of a pump unit 12 installed as cooling water supplying equipment, a pipe 16 is connected to the electrified atomization heads 10 via a manual valve (gate valve) 14 and a remote open/close valve 22c, and the pipe 16 is branched and then connected to the electrified atomization heads 10, which are installed in the atomization cooling areas A and B, via remote open/close valves 22a and 22b. An environment sensor 18 is installed in each of the atomization cooling areas A and B and connected to a system control board 20 by a signal line. The environment sensor 18 measures the air temperature, humidity, rainfall, wind speed, etc. of the atomization cooling area A or B and transmits that to the system control board 20. Furthermore, the remote open/close valves 22a to 22d are connected to the system control board 20 by signal lines and can be remotely controlled to be opened/closed. While the atomization cooling equipment is stopped, the system control board 20 causes the remote open/close valves 22a to 22c to be in a closed state to open the remote control valve 22d. Upon activation of atomization cooling, the system control board 20 subjects the remote control valve 22d of the drain side to closing control, subjects the remote control valves 22a to 22c to opening control, and, at the same time, activates the pump unit 12 to pressurize the cooling water and supply the cooling water to the electrified atomization heads 10.

Figure 2:
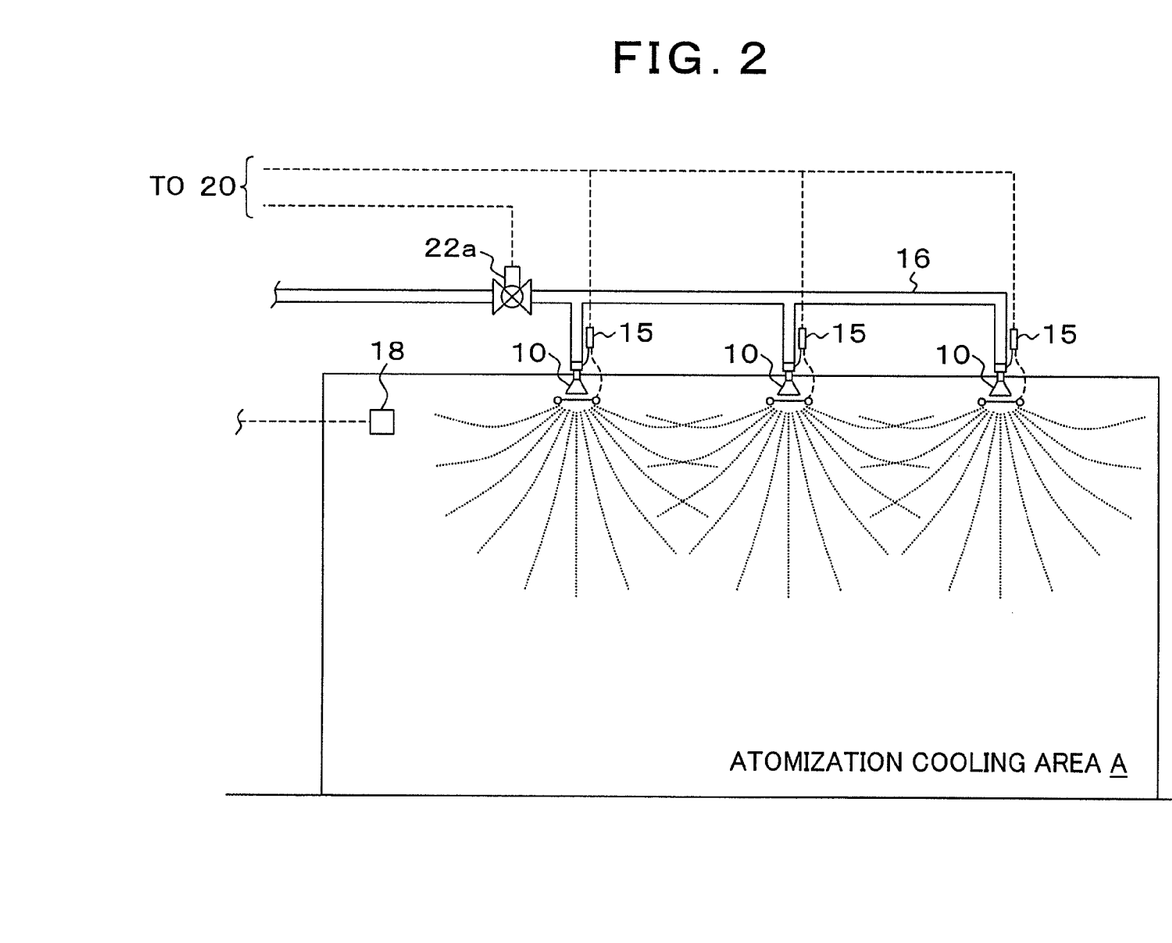
FIG. 2 is an explanatory drawing focusing on an atomization cooling area A of FIG. 1.

FIG. 2 is an explanatory drawing focusing on the atomization cooling area A of FIG. 1. The electrified atomization heads 10 are installed at high places of the atomization cooling area A. The pipe 16 from the pump unit 12 shown in FIG. 1 is connected to the electrified atomization heads 10 via the remote open/close valve 22a. Voltage application units 15 are installed above each of the electrified atomization heads 10 so as to apply a predetermined voltage to the electrified atomization head 10 respectively, electrify the atomized water jetted from the electrified atomization head 10, and atomize the water as is elucidated in later explanation.

Figure 3A:
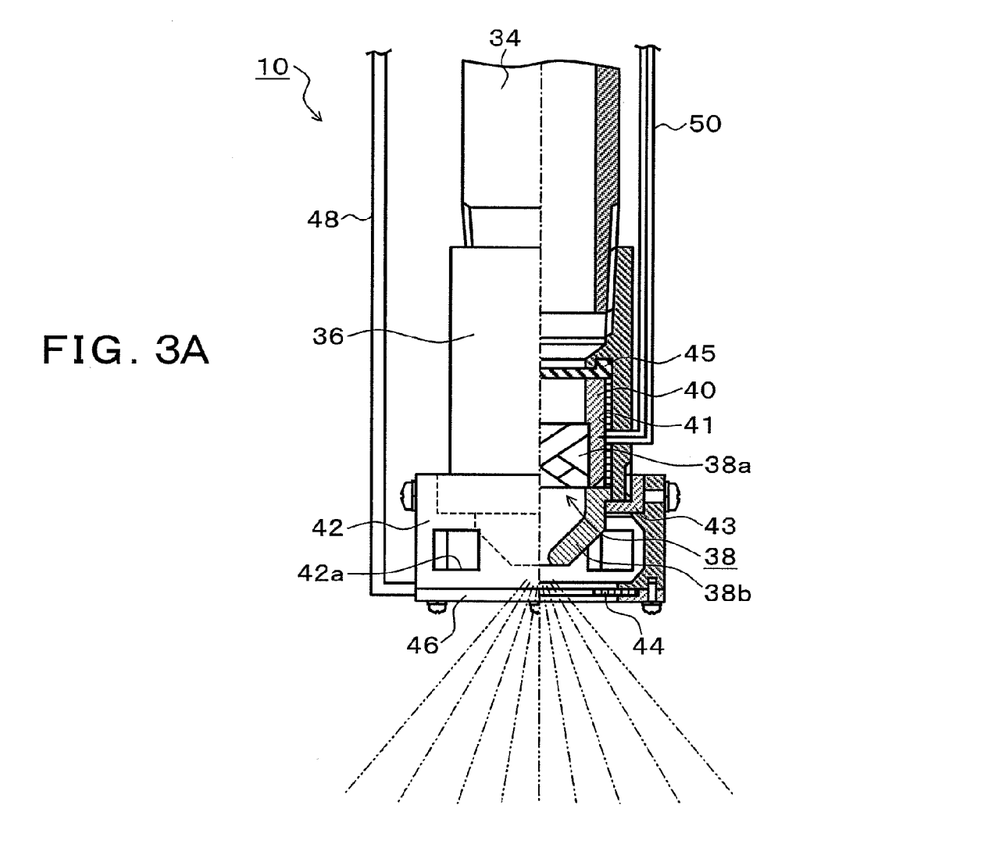
FIGS. 3A to 3D are explanatory drawings showing an embodiment of an electrified atomization head using a ring-like induction electrode unit.
Figure 3B:
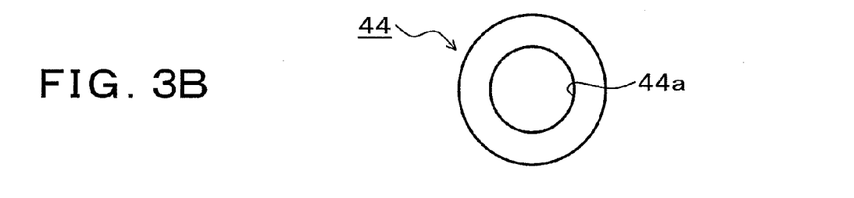
Figure 3C:
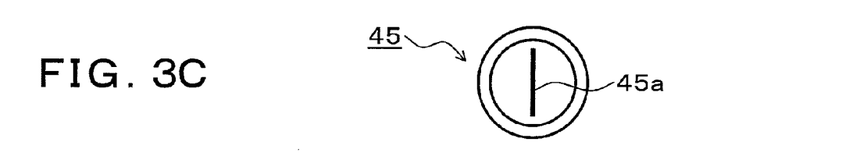
Figure 3D:
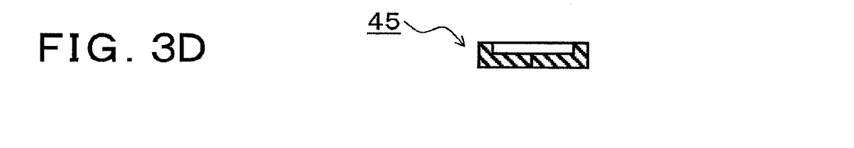

FIGS. 3A to 3D show embodiments of the electrified atomization head 10 shown in FIG. 1 and FIG. 2, and the present embodiment is characterized by using a ring-like induction electrode unit. In FIG. 3A, in the electrified atomization head 10, a head main body 36 is screw-fixed with a distal end of a falling pipe 34 connected to the pipe 16 from the pump unit. A cylindrical water-side electrode unit 40 is incorporated at the inside of the distal end of the head main body 36 via an insulating member 41. An earth cable 50 is wired from the voltage application unit 15, which is installed at the upper part as shown in FIG. 2, with respect to the water-side electrode unit 40 and is connected to the water-side electrode unit 40, which is installed at the inside of the head main body 36 via a fixing member 43. The application voltage of the water-side electrode unit 40 is caused to be 0 volt and lead to the earth side by the connection of the earth cable 50. An atomization nozzle 38 is provided below the water-side electrode unit 40. The atomization nozzle 38 is composed of a nozzle rotor 38a, which is provided in the interior of the water-side electrode unit 40 side, and a nozzle head 38b, which is provided in the distal end side. The atomization nozzle 38 receives supply of the cooling water, which is pressurized and supplied from the pump unit 12 of FIG. 1, from the falling pipe 34; and the atomization nozzle converts the cooling water into fine water particles and atomizes the particles when the cooling water passes through the nozzle main body 38a and is jetted from the nozzle head 38b to the outside. In the present embodiment, the atomized water from the atomization nozzle 38 is atomized water having an average particle size of 100 µm or less. A cover 42 using an insulating material is fixed by screw-fixing with respect to the atomization nozzle 38 via the fixing member 43. The cover 42 is an approximately-cylindrical member and incorporates a ring-like induction electrode unit 44 in an open part in the lower side by screw-fixing of a stopper ring 46. As is focused on in FIG. 3B, the ring-like induction electrode unit 44 forms an opening 44a, which allows the jetted particles from the atomization nozzle 38 to pass therethrough, at the center of a ring-like main body thereof. With respect to the ring-like induction electrode unit 44 disposed below the cover 42, an voltage application cable 48 is wired from the voltage application unit 15 in the upper part shown in FIG. 2; and the voltage application cable 48 penetrates through the cover 42, which is composed of the insulating material, and is connected to the ring-like induction electrode unit 44 so that a voltage can be applied thereto. Furthermore, a water-leakage preventing valve 45 is incorporated between the distal end of the falling pipe 34 and the water-side electrode unit 40. As is focused on FIGS. 3A to 3D, the water-leakage preventing valve 45 is a valve member made of rubber and forms a slit 45a at the center of a circular-plate-like rubber member. Upon atomization of the cooling water, the rubber of the water-leakage preventing valve 45 is flexed and deformed by supply of the pressurized cooling water, thereby opening the slit 45a and allowing passage of the cooling water. On the other hand, when atomization of the cooling water is stopped, the slit 45a is closed, thereby preventing dripping of the cooling water remaining in the pipe-side. Herein, the water-side electrode unit 40 and the ring-like induction electrode unit 44 used in the electrified atomization head 10 of the present embodiment may be, other than metal having electrical conductivity, a resin having electrical conductivity, rubber having electrical conductivity, or a combination of these. When the cooling water is to be atomized from the electrified atomization head 10, the voltage application units 15 shown in FIG. 2 are operated by a control signal, which is from the system control board 20 shown in FIG. 1, and applies a predetermined DC application voltage between 0.3 kilovolt to 20 kilovolts to the ring-like induction electrode unit 44 while the water-side electrode unit 40 serves as the earth side of 0 volt. When a voltage of, for example, several kilovolts is applied between the water-side electrode unit 40 and the ring-like induction electrode unit 44 in this manner, an external electric field is generated between the electrodes by this voltage application, the jetted particles are electrified through the jetting process of converting the cooling water to the jetted particles from the atomization nozzle 38, and the electrified jetted particles can be atomized to the outside. Next, a monitoring operation in the embodiment of FIG. 1 will be explained. When the system control board 20 determines that, for example, it has reached the cooling activation time set by a timer, the system control board 20 subjects the remote open/close valve 22d of the drain side to closing control, subjects the remote open/close valves 22a to 22c to opening control, and, at the same time, activates the pump unit 12 to pressurize and supply the cooling water from the water source to the pipe 16. Other than the time setting by the timer, the activation by the system monitoring board 20 may be, for example, manual operation by an administrator or automatic activation carried out when predetermined activation conditions are obtained from measurement data such as the air temperature, humidity, rainfall, and wind speed by the environment sensor 18 installed in the atomization cooling area A or B. At the same time as the pressurization and supply of the cooling water by activation of the pump unit 12, the system control board 20 transmits an activation signal to the voltage application unit 15 provided at the electrified atomization head 10 shown in FIG. 2. In response to this activation signal, the voltage application unit 15 supplies a DC application voltage of, for example, several kilovolts to the electrified atomization head 10. Therefore, in the electrified atomization head 10 shown in FIG. 3A, when the pressurized cooling water is to be converted to jetted particles by jetting and atomized from the atomization nozzle 38, a voltage of several kilovolts is applied to the ring-like induction electrode unit 44 side connected to the voltage application cable 48 while the water-side electrode unit 40 connected to the earth cable 50 is at 0 volt. The external electric field generated by this voltage application can be applied to the cooling water which is in the jetting process in which the cooling water is jetted from the atomization nozzle 38 and passes through the opening 45 of the ring-like induction electrode unit 44 so as to electrify and atomize the jetted particles converted by the jetting.

As is focused on in FIG. 2, the water particles atomized from the electrified atomization head 10 to the atomization cooling area A are electrified. Therefore, the water particles efficiently adhere to the skin of the people who pass through the area because of the Coulomb force caused by the electrification and absorb the heat of evaporation when adhering to and evaporating from the skin, thereby obtaining a highly refreshing cooling sensation. Furthermore, for example when a positive DC voltage is applied to the ring-like induction electrode unit 44 while the water-side electrode unit 40 is at 0volt in the electrified atomization head 10 of FIG. 3A, the atomized water particles are electrified only with negative electric charge. When the water particles electrified only with the negative electric charge in this manner are atomized, repulsive force works between the electrified water particles in the air, thereby reducing the probability that the water particles are collided and associated with each other and grow and fall, the density of the water particles staying in the air is increased, the specific gravity of the atomized-water-mixed air in appearance is increased compared with that of a non-electrified case, and the tendency that the air is dissipated upward is suppressed. As a result, the cooling effect is enhanced. Furthermore, when the atomized water from the electrified atomization head 10 is negatively electrified, a state similar to that of the so-called Lenard effect said to be generated at natural waterfalls can be generated, and the refreshing cooling sensation can be increased.

Figure 4A:
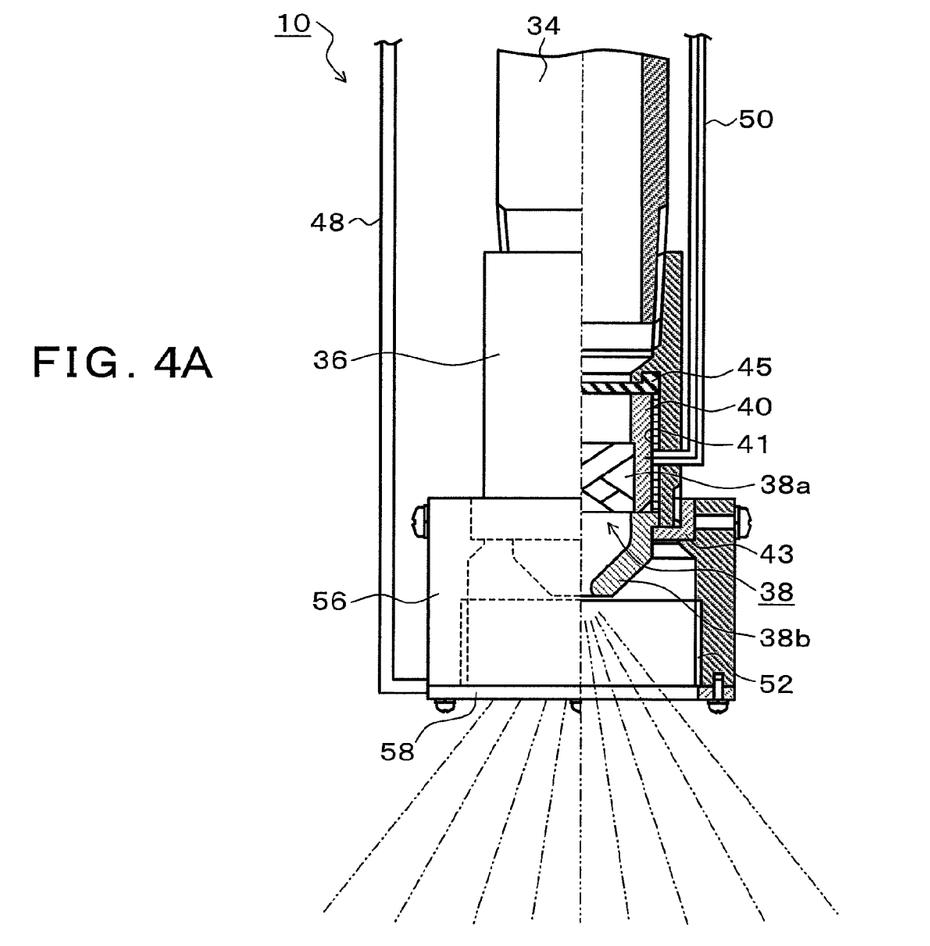
FIGS. 4A and 4B are explanatory drawings showing another embodiment of the electrified atomization head using a cylindrical induction electrode unit.
Figure 4B:
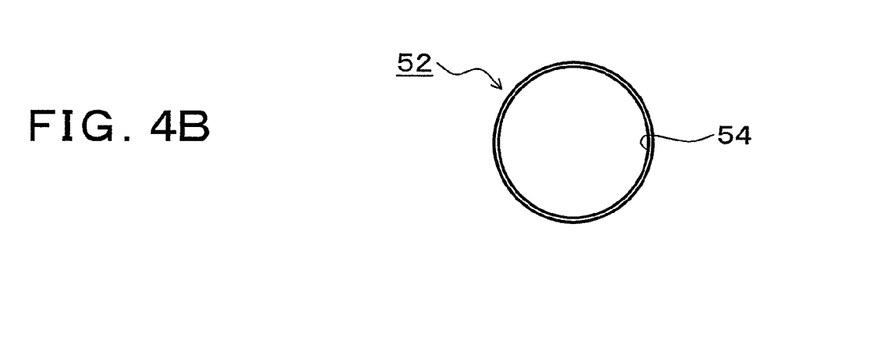

FIGS. 4A and 4B are explanatory drawings showing another embodiment of the electrified atomization head using a cylindrical induction electrode unit. In FIG. 4A, in the electrified atomization head 10 of the present embodiment, the head main body 36 is fixed to the distal end of the falling pipe 34 by screw-fixing, the water-side electrode unit 40 is disposed at the inside of the head main body 36 via the insulating member 41, and the earth cable 50 is connected thereto from the upper side. The atomization nozzle 38 is disposed below the water-side electrode unit 40, and the atomization nozzle 38 is composed of the nozzle main body (rotor) 38a and the nozzle head 38b. A cylindrical cover 56 using an insulating material is attached to the outside of the lower part of the nozzle head 38b via the fixing member 43. A cylindrical induction electrode unit 52 is disposed in the interior of the open part of the lower end of the cover 56 by screw-fixing by a stopper ring 58. A through hole 54 is formed in the cylindrical body of the cylindrical induction electrode unit 52 as shown in the plan view of FIG. 4B focusing thereon. The voltage application cable 48 is connected to the cylindrical induction electrode unit 52 through the cover 56 using an insulating material, thereby supplying an application voltage for electrification. The water-leakage preventing valve 45 is incorporated between the distal end of the falling pipe 34 and the water-side electrode unit 40, and the water-leakage preventing valve 45 is a valve member made of rubber and forms the slit 45a at the center of the circular-plate-like rubber member as focused on in FIGS. 3A to 3D. Also in the electrified atomization head 10 using the cylindrical induction electrode unit 52, when the pressurized cooling water is to be jetted from the atomization nozzle 38 to atomize water particles, a voltage of, for example, several kilovolts is applied to the cylindrical induction electrode unit 52 while the water-side electrode unit 40 is at 0 volt. As a result, the water particles discharged from the atomization nozzle 38 can be electrified in the jetting process in which the water particles pass through the space of the through hole 54 of the cylindrical induction electrode unit 52 wherein an external electric field generated by the application is formed, and the electrified water particles can be atomized.

Figure 5A:
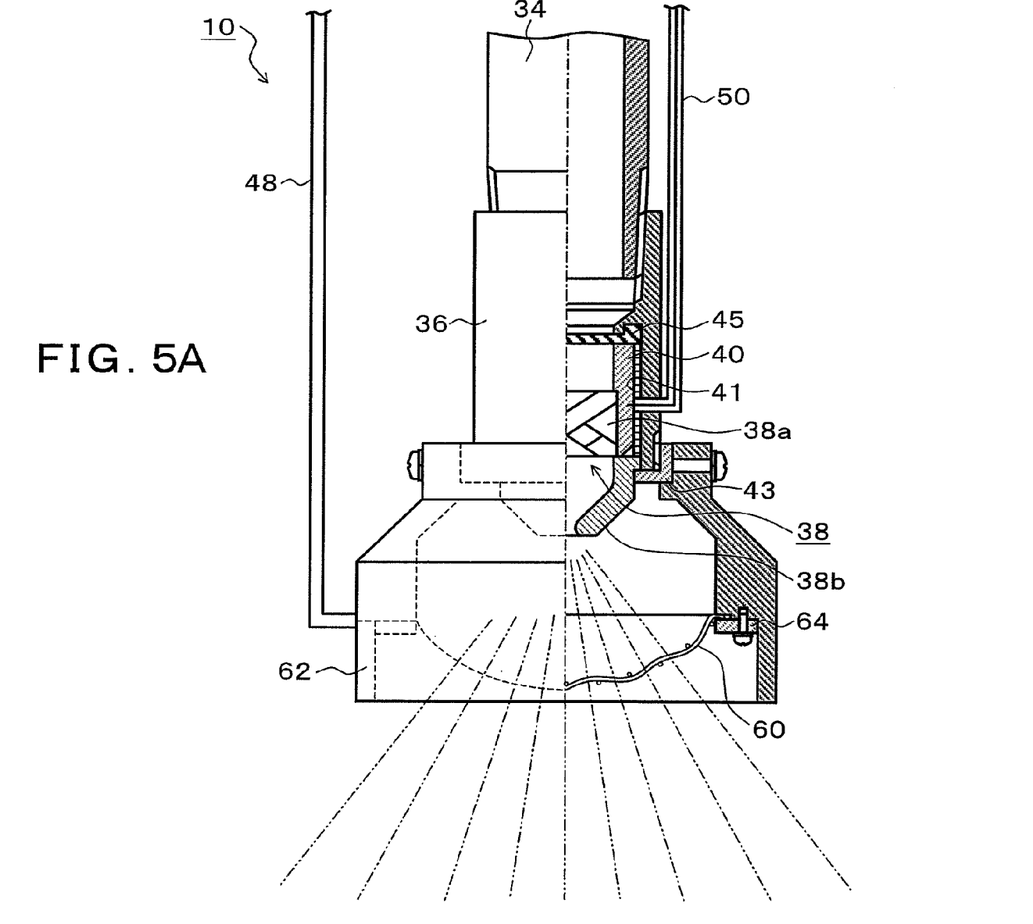
FIGS. 5A and 5B are explanatory drawings showing another embodiment of the electrified atomization head using a wire-mesh-like induction electrode unit.
Figure 5B:
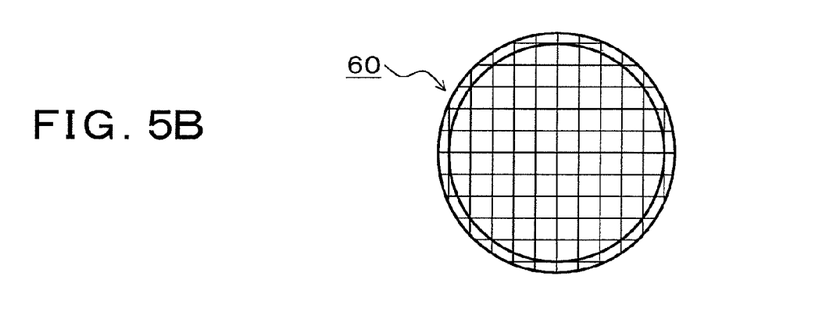

FIGS. 5A and 5B are explanatory drawings showing another embodiment of the electrified atomization head using a wire-mesh-like induction electrode unit. In the electrified atomization head 10 of FIG. 5A, the head main body 36 is fixed to the lower part of the falling pipe 34 by screw-fixing, the water-side electrode unit 40 is disposed therein via the insulating member 41, and the earth cable 50 is connected thereto. A cover 62 using an insulating material is attached to the lower side of the atomization nozzle 38 via the fixing member 43, and a wire-mesh-like induction electrode unit 60 is attached to the open part of the interior of the cover 62. The wire-mesh-like induction electrode unit 60 has the planar shape as focused on by FIG. 5B and uses a wire mesh made of metal having predetermined meshes. The cover 62 is an insulating material, and the voltage application cable 48 is connected through the cover 62 so that a voltage can be applied to the wire-mesh-like induction electrode unit 60. The water-leakage preventing valve 45 is incorporated between the distal end of the falling pipe 34 and the water-side electrode unit 40, and the water-leakage preventing valve 45 is a valve member made of rubber and forms the slit 45a at the center of the circular-plate-like rubber member as focused on in FIGS. 3A to 3D. Also in the embodiment of FIGS. 5A and 5B, when the cooling water is to be jetted from the atomization nozzle 38 and converted to water particles, a DC voltage of, for example, several kilovolt s is applied to the wire-mesh-like induction electrode unit 60 side while the water-side electrode unit 40 is at 0 volt. As a result, an external electric field can be generated in the space of jetting from the atomization nozzle 38, the jetted particles passing therethrough can be electrified when the particles pass through the open part of the wire mesh, and the electrified water particles can be atomized.

Figure 6A:
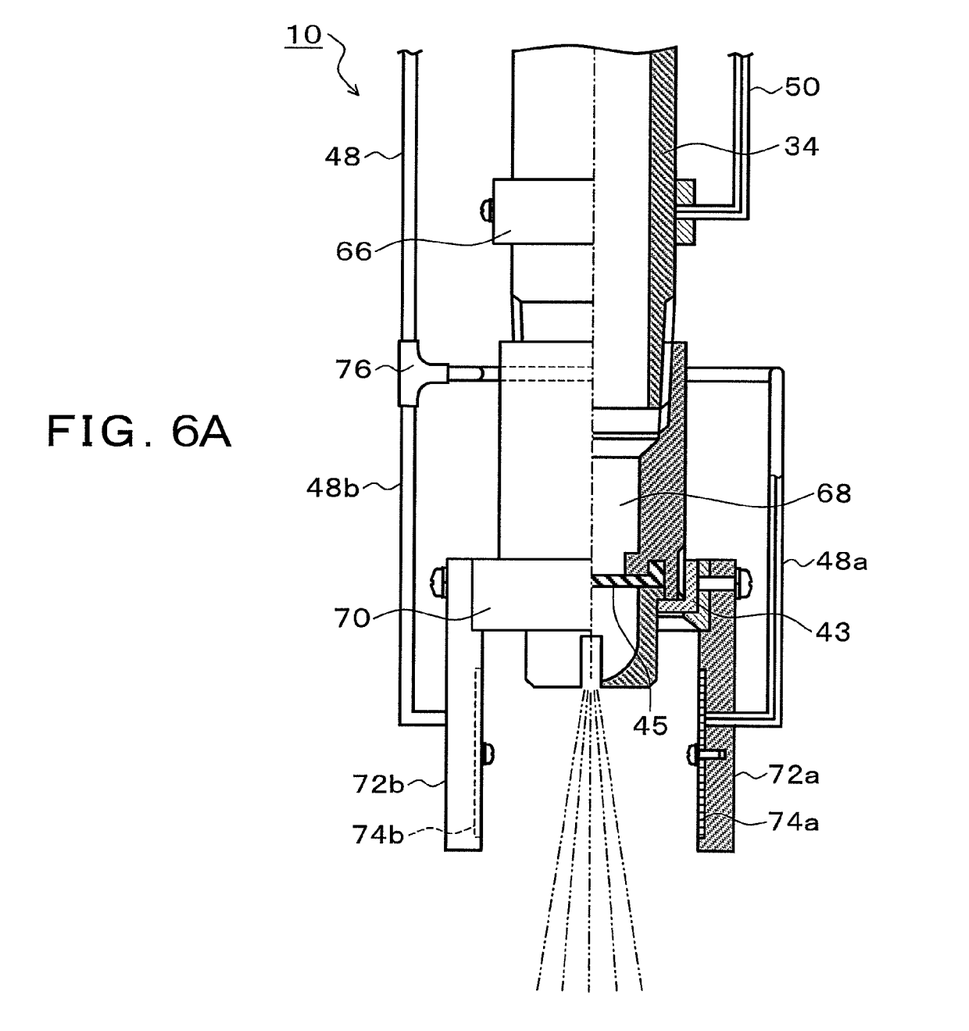
FIGS. 6A and 6B are explanatory drawings showing another embodiment of the electrified atomization head using a parallel-plate induction electrode unit.
Figure 6B:
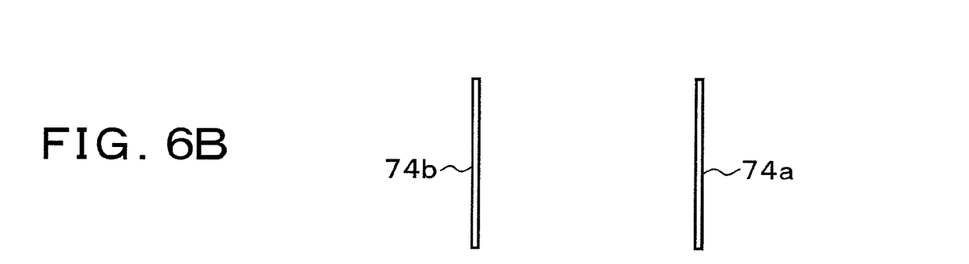

FIGS. 6A and 6B are explanatory drawings showing an embodiment of the electrified atomization head using a parallel-plate induction electrode unit. In the electrified atomization head 10 of FIGS. 6A and 6B, an atomization nozzle 68 is fixed at the lower part of the falling pipe 34 by screw-fixing. In this embodiment, the water-side electrode unit uses the falling pipe 34 per se. Therefore, a connection ring 66 is used for the falling pipe 34 to directly connect the earth cable 50. A ring holder 70 using an insulating material is fixed by screw-fixing at a lower part of the atomization nozzle 68, and a pair of plate-like holders 72a and 72b are parallely disposed in the state in which the holders are cantilevered and suspended in the lower side of the ring holder 70. Parallel-plate induction electrode units 74a and 74b are fixed respectively on the inner opposing surfaces of the holders 72a and 72b. The parallel-plate induction electrode units 74a and 74b are parallely disposed in the plan view seen from the lower side thereof as shown in FIG. 6B. The holders 72a and 72b are insulating materials, and branch cables 48a and 48b branched from the voltage application cable 48 by a branching unit 76 penetrate through the holders 72a and 72b and are connected to the parallel-plate induction electrode units 74a and 74b, respectively, so as to apply an application voltage of, for example, several kilovolts. The water-leakage preventing valve 45 is incorporated between the distal end of the falling pipe 34, which functions as a water-side electrode unit, and the water-side electrode unit 40. The water-leakage preventing valve 45 is a valve member made of rubber and forms the slit 45a at the center of the circular-plate-like rubber member as focused on by FIGS. 3A to 3D. Also in the electrified atomization head 10 of FIGS. 6A and 6B, when the cooling water is to be jetted from the atomization nozzle 68 and atomized as jetted particles, a voltage of, for example, several kilovolts is applied between the parallel-plate induction electrode units 74a and 74b parallelly disposed in the distal end side of the falling pipe 34 serving as the water-side electrode unit. As a result, an external electric field can be generated in the space sandwiched by the parallel-plate induction electrode units 74a and 74b, the jetted water particles can be electrified in the process in which the water particles jetted from the atomization nozzle 68 pass through the external electric field, and the electrified water particles can be atomized.

Figure 7A:
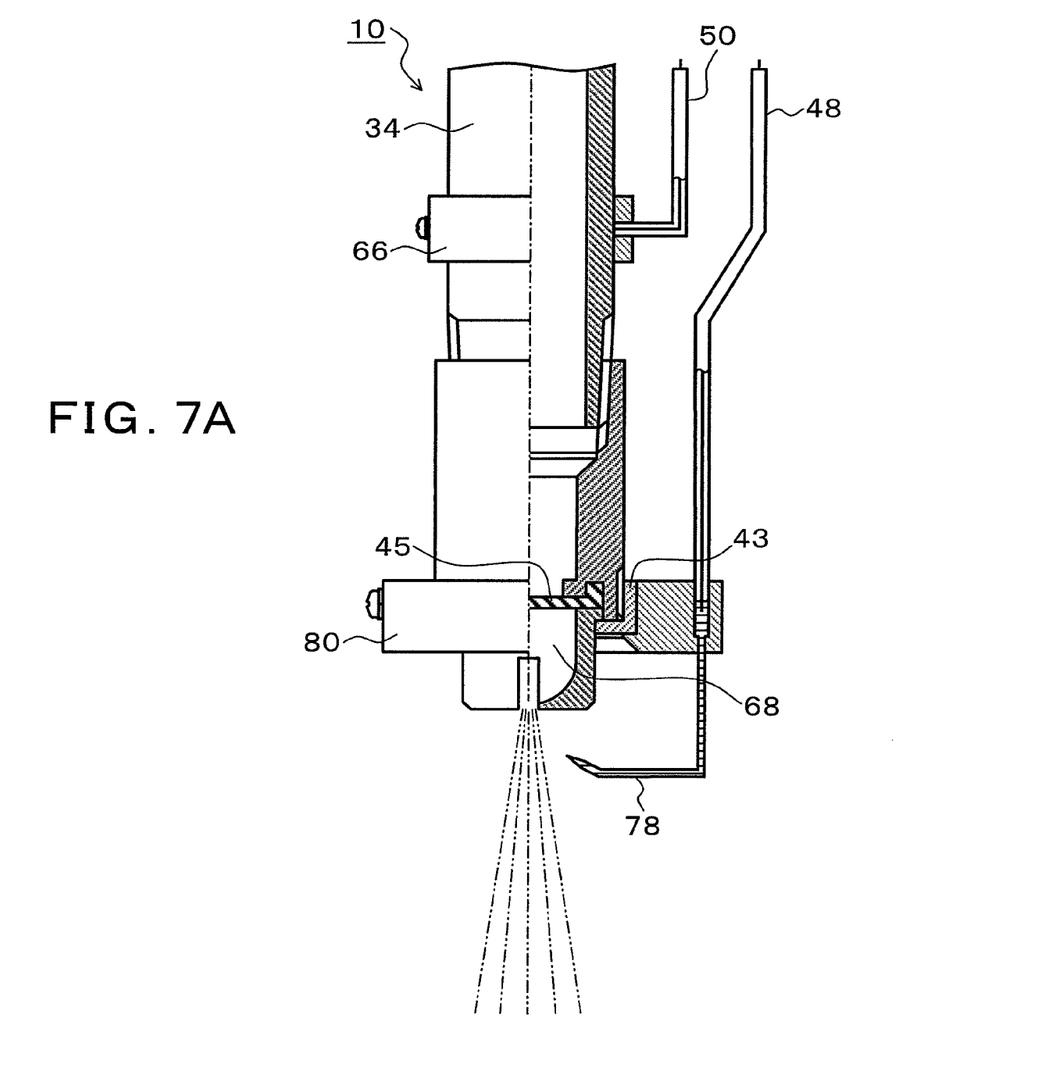
FIGS. 7A and 7B are explanatory drawings showing another embodiment of the electrified atomization head using a needle-like induction electrode unit.
Figure 7B:
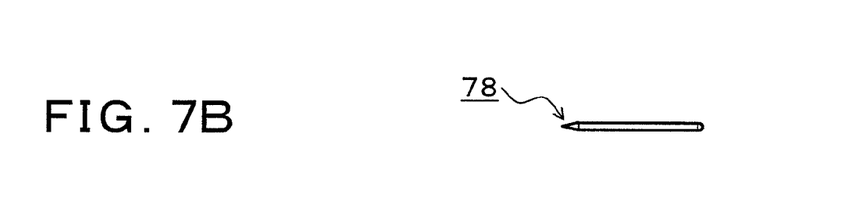

FIGS. 7A and 7B are explanatory drawings showing another embodiment of the electrified atomization head using a needle-like induction electrode unit. In the electrified atomization head 10 of FIG. 7A, the atomization nozzle 68 is fixed by screwing at the distal end of the falling pipe 34 used as a water-side electrode unit, the connection ring 66 is attached to the falling pipe 34 so as to electrically connect the earth cable 50. A ring holder 80 using an insulating material is attached to the distal end side of the atomization nozzle 68 via the fixing member 43. A needle-like induction electrode unit 78 is attached to a lower part of the ring holder 80. The needle-like induction electrode unit 78 is bent in the shape of a reversed L and has a needle shape in which a distal end is bent obliquely toward the open part of the atomization nozzle 68, and the plan view seen from the lower side thereof is as shown in FIG. 7B. The voltage application cable 48 is electrically connected to the needle-like induction electrode unit 78 attached to the ring holder 80. The water-leakage preventing valve 45 is incorporated between the distal end of the falling pipe 34, which functions as a water-side electrode unit, and the water-side electrode unit 40. The water-leakage preventing valve 45 is a valve member made of rubber and forms the slit 45a at the center of the circular-plate-like rubber member as focused on by FIGS. 3A to 3D. Also in this embodiment, when the cooling water is to be jetted, converted to water particles, and atomized from the atomization nozzle 68, a DC voltage of, for example, several kilovolts is applied between the falling pipe 34 functioning as the water-side electrode unit and the needle-like induction electrode unit 78 disposed in the distal end side of the nozzle. As a result, an external electric field can be generated in the space between the nozzle open part and the distal end of the needle-like induction electrode unit 78, the jetted water particles can be electrified thereat in the jetting process in which the water is converted to the water particles jetted from the atomization nozzle 68, and the water can be atomized as the electrified water particles.

The various structures shown in above described embodiments can be applied to the electrified atomization head 10 used in the present embodiment; however, the structure is not limited thereto, and an electrified atomization head having an arbitrary structure can be used. Moreover, in the above described embodiments, the case in which a DC electrification voltage is applied to the electrified atomization head is taken as an example; however, an AC or pulsed electrification voltage may be applied. Moreover, the present invention includes arbitrary modifications that do not impair the objects and advantages of the present invention, and the present invention is not limited by the numerical values shown in the above described embodiments.

The invention claimed is:

1. An atomization cooling apparatus comprising:
    a cooling water supplying device for supplying pressurized cooling water;
    an electrified atomization head for electrifying and atomizing the pressurized cooling water supplied by the cooling water supplying device, the electrified atomization head to be installed in a cooling target space; and
    a voltage application unit for applying an electrification voltage to the electrified atomization head,
    wherein the electrified atomization head includes:
        an atomization nozzle connected to a pipe which supplies the pressurized cooling water, the atomization nozzle for atomizing the pressurized cooling water into water particles converted by jetting the pressurized cooling water to the cooling target space;
        an induction electrode unit located in a jetting space side of the atomization nozzle;
        a water-side electrode unit located between the pipe and the atomization nozzle, and positioned to contact the pressurized cooling water; and
        a water-leakage preventing valve located between the pipe and the atomization nozzle,
    wherein the voltage application unit applies an external electric field, which is generated by applying a voltage between the induction electrode unit and the water-side electrode unit, to the pressurized cooling water in a jetting process in the atomization nozzle to electrify the water particles, and
    wherein the water-leakage preventing valve is made of circular-plate-shaped rubber having a slit formed in its center and is adapted such that the slit is opened when the pressurized cooling water is supplied to the electrified atomization head and is closed when the pressurized cooling water is stopped.

2. The atomization cooling apparatus according to claim 1, wherein the induction electrode unit of the electrified atomization head includes at least one of a metal having electrical conductivity, a resin having electrical conductivity, and rubber having electrical conductivity, and has a ring shape, a cylindrical shape, a vertical flat plate shape, a parallel-plate shape, a linear shape, or a wire-mesh shape.

3. The atomization cooling apparatus according to claim 1, wherein the water-side electrode unit is grounded, and the voltage application unit applies a predetermined voltage to the induction electrode unit.

4. The atomization cooling apparatus according to claim 3, wherein the voltage application unit applies a DC voltage of 0.3 kilovolt to 20 kilovolts to the induction electrode unit.

5. The atomization cooling apparatus according to claim 1, wherein the electrified atomization head atomizes the pressurized cooling water to have an average particle size of 100 μm or less.

* * * * *